US012689760B2

(12) United States Patent

Lim et al.

(10) Patent No.: US 12,689,760 B2

(45) Date of Patent: ***Jul. 21, 2026

(54) METHOD AND APPARATUS FOR IMAGE CODING/DECODING

(71) Applicant: Electronics and Telecommunications Research Institute, Daejeon (KR)

(72) Inventors: Sung Chang Lim, Daejeon-si (KR); Hui Yong Kim, Daejeon-si (KR); Jin Ho Lee, Daejeon (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/892,820

(22) Filed: Sep. 23, 2024

(65) Prior Publication Data

US 2025/0016360 A1      Jan. 9, 2025

Related U.S. Application Data

(63) Continuation of application No. 17/903,494, filed on Sep. 6, 2022, now Pat. No. 12,126,826, which is a
(Continued)

(30) Foreign Application Priority Data

Jan. 19, 2012   (KR) ........................ 10-2012-0006282
Jan. 18, 2013   (KR) ........................ 10-2013-0005655

(51) Int. Cl.
H04N 19/52         (2014.01)

(52) U.S. Cl.
CPC .................................. *H04N 19/52* (2014.11)

(58) Field of Classification Search
CPC ...................................................... H04N 19/52
See application file for complete search history.

(56) References Cited

U.S. PATENT DOCUMENTS 6,343,100 B1   1/2002   Fujiwara et al.
9,319,657 B2   4/2016   Kang et al.
(Continued)

FOREIGN PATENT DOCUMENTS

CN          1523896 A     8/2004
CN          1960496 A     5/2007
(Continued)

OTHER PUBLICATIONS

Bici Oguz et al., "Non-CE13: Simplification of merge mode," Joint Collaborative Team on Video Coding (JCT-VC) of ITU-T SG16 WP3 and ISO/IEC JTC1/SC29/WG1, 7.sup.th Meeting: Geneva, CH, Nov. 8, 2011, Document: JCTVC-G593.
(Continued)

*Primary Examiner* — Dave Czekaj
*Assistant Examiner* — Shanika M Brumfield
(74) *Attorney, Agent, or Firm* — Michael Best & Friedrich LLP

(57)                ABSTRACT

A method for decoding an image according to the present invention comprises the steps of: decoding a residual block by quantizing and inverse transforming an entropy-decoded residual block; generating a prediction block via motion compensation; and decoding an image by adding the decoded residual block to the prediction block, wherein on the basis of the maximum number of motion vector candidates of the motion vector candidate list related to the prediction block, a motion vector candidate list is adjusted by adding a particular motion vector candidate or by discarding a portion from among the motion vector candidates, and in the prediction block generation step, a prediction
(Continued)

motion vector of the prediction block is determined on the basis of the adjusted motion vector candidate list. Accordingly, the complexity of arithmetic operations is reduced during encoding/decoding of an image.

4 Claims, 14 Drawing Sheets

Related U.S. Application Data continuation of application No. 17/214,040, filed on Mar. 26, 2021, now Pat. No. 11,470,342, which is a continuation of application No. 16/829,241, filed on Mar. 25, 2020, now Pat. No. 11,006,142, which is a continuation of application No. 16/238,204, filed on Jan. 2, 2019, now Pat. No. 10,638,154, which is a continuation of application No. 14/372,816, filed as application No. PCT/KR2013/000418 on Jan. 18, 2013, now Pat. No. 10,218,999.

(56) References Cited

U.S. PATENT DOCUMENTS

| | | | |
|---|---|---|---|
| 9,392,300 | B2 | 7/2016 | Kim et al. |
| 10,218,999 | B2 | 2/2019 | Lim et al. |
| 2004/0247031 | A1 | 12/2004 | Hagai et al. |
| 2008/0075169 | A1 | 3/2008 | Ugur et al. |
| 2010/0026903 | A1 | 2/2010 | Tetsukawa et al. |
| 2011/0176612 | A1 | 7/2011 | Tsai et al. |
| 2011/0176615 | A1 | 7/2011 | Lee et al. |
| 2011/0194608 | A1 | 8/2011 | Rusert et al. |
| 2011/0194609 | A1 | 8/2011 | Rusert et al. |
| 2012/0195368 | A1 | 8/2012 | Chien et al. |
| 2012/0269268 | A1 | 10/2012 | Kim et al. |
| 2012/0269270 | A1 | 10/2012 | Chen et al. |
| 2012/0275522 | A1 | 11/2012 | Kim et al. |
| 2012/0320984 | A1 | 12/2012 | Zhou |
| 2013/0107963 | A1 | 5/2013 | Wahadaniah et al. |
| 2013/0114725 | A1 | 5/2013 | Lou et al. |
| 2013/0188716 | A1 | 7/2013 | Seregin et al. |
| 2013/0242046 | A1 | 9/2013 | Zhang et al. |
| 2014/0133570 | A1 | 5/2014 | Lee |

FOREIGN PATENT DOCUMENTS

| | | | | |
|---|---|---|---|---|
| CN | 101102503 | A | 1/2008 | |
| CN | 101102512 | A | 1/2008 | |
| CN | 101653009 | A | 2/2010 | |
| CN | 102027746 | A | 4/2011 | |
| CN | 102215386 | A | 10/2011 | |
| CN | 102273206 | A | 12/2011 | |
| JP | 2013-85235 | A | 5/2013 | |
| JP | 6449203 | B2 | 1/2019 | |
| KR | 10-2010-0048435 | A | 5/2010 | |
| KR | 10-2011-0008653 | A | 1/2011 | |
| KR | 10-2011-0027480 | A | 3/2011 | |
| KR | 10-2011-0045908 | A | 5/2011 | |
| KR | 10-2011-0085896 | A | 7/2011 | |
| KR | 20110085896 | A | 7/2011 | |
| WO | 2010/050706 | A2 | 5/2010 | |
| WO | 2011/010858 | A2 | 1/2011 | |
| WO | 2011/031030 | A2 | 3/2011 | |
| WO | 2011/052897 | A2 | 5/2011 | |
| WO | 2012/173415 | A2 | 12/2012 | |
| WO | 2013/002557 | A2 | 1/2013 | |
| WO | 2013/067924 | A1 | 5/2013 | |
| WO | WO-2014168443 | A1 * | 10/2014 | ........... H04N 19/597 |

OTHER PUBLICATIONS

Bross et al., "WD5: Working Draft 5 of High-Efficiency Video Coding," Joint Collaborative Team on Video Coding (JCT-VC) of ITU-T SG16 WP3 and ISO/IEC JTC1/SC29/WG11, Document: JCTVC-G1103_d4, 7th Meeting: Geneva, CH, Nov. 21-30, 2011.
Bross et al., "WD5: Working Draft 5 of High-Efficiency Video Coding," Joint Collaborative Team on Video Coding (JCT-VC) of ITU-T SG16 WP3 and ISO/IEC JTC1/SC29/WG11, version 12, Document: JCTVC-G1103_d4, 7th Meeting: Geneva, CH, Nov. 21-30, 2011 (237 pages).
Bross, et al., "BoG Report of CE9: MV Coding and Skip/Merge Operations," Joint Collaborative Team on Video Coding (JCT-VC) of ITU-T SG16 WP3 and ISO/IEC JTC1/SC29/WG11, version 4, Document: JCTVC-E481, 5th Meeting: Geneva, CH, Mar. 16-23, 2011 (20 pages).
Bross, et al., "High Efficiency Video Coding (HEVC) Text Specification Draft 6," Joint Collaborative Team on Video Coding (JCT-VC) of ITU-T SG16 WP3 and ISO/IEC JTC1/SC29/WG11, version 12, Document: JCTVC-H1003_dBA, 7th Meeting: Geneva, CH, Nov. 21-30, 2011 (1 page).
Bross, et al., "WD4: Working Draft 4 of High-Efficiency Video Coding," Joint Collaborative Team on Video Coding (JCT-VC) of ITU-T SG16 WP3 and ISO/IEC JTC1/SC29/WG11, Version 8, Document: JCTVC-F803_d6, 6th Meeting: Torino, IT, Jul. 14-22, 2011 (76 pages).
Chen, Jianle. "MVP index parsing with fixed number of candidates." Joint Collaborative Team on Video Coding (JCT-VC) of ITU-T SG16 WP3 and ISO/IEC JTC1/SC29/WG11, Document: JCTVC-F402, 6th Meeting, Torino, IT., Jul. 14-22, 2011.
English Translation of Related Priority Application Korean Patent No. 20120006282 dated Jan. 18, 2012 (35 pages, plus a statement of relevance).
European Patent Office Action for Application No. 13738327.9 dated Jun. 17, 2019 (5 pages).
European Patent Office Action for Application No. 20195005.2 dated Aug. 16, 2022 (91 pages).
European Patent Office Search Report for Application No. 21202076.2 dated Feb. 10, 2022 (5 pages).
Extended European Search Report dated Aug. 21, 2015 in counterpart European Application No. 13738327.9.
Hiroya Nakamura et al., "Non-CE9: Construction of MVP list without using scaling operation", Joint Collaborative Team on Video Coding (JCT-VC) of ITU-T SG16 WP3 and ISO/IEC JTC1/SC29/WG11, Document: JCTVC-G219, 7.sup.th Meeting: Geneva, CH, Nov. 21-30, 2011.
International Search Report dated Apr. 12, 2013 in counterpart Application No. PCT/KR2013/000418 (5 pages, in Korean, with English language translation).
ITU-T, "Recommendation H.264: Advanced video coding for generic audiovisual services," Series H: Audiovisual and Multimedia Systems, Infrastructure of audiovisual services—Coding of Moving video, 2010, pp. 158-160.
Japanese Office Action dated Aug. 18, 2015 in counterpart Japanese Application No. 2014-553258 (5 pages in Japanese).
Lim, et al., "Non-CE9: Simplification on AMVP List Construction," Joint Collaborative Team on Video Coding (JCT-VC) of ITU-T SG16 WP3 and ISO/IEC JTC1/SC29/WG11, version 2, Document: JCTVC-H0239, 8th Meeting: San Jose, CA, USA, Feb. 1-10, 2012 (5 pages).
Na Zhang et al., "CE9: Improvement in temporal candidate of merge mode and AMVP", Joint Collaborative Team on Video Coding (JCT-VC) of ITU-T SG16 WP3 and ISO/IEC JTC1/SC29/WG11, Document: JCTVC-G343, 7.sup.th Meeting: Geneva, CH, Nov. 21-30, 2011.
Nakamura, et al., "Non-CE9: Construction of MVP list without using scaling operation", Joint Collaborative Team on Video Coding (JCT-VC) of ITU-T SG16 WP3 and ISO/IEC JTC1/SC29/WG11, Document: JCTVC-G219, version 2, 7th Meeting: Geneva, CH, Nov. 21-30, 2011 (11 pages).
Nakamura, Hiroya, et al. "Unification of derivation process for merge mode and MVP." document JCTVC-F419 (2011) (10 pages).
Sung-Chang Lim et al., "Non-CE9: Simplification on AMVP list construction," Joint Collaborative Team on Video Coding (JCT-VC) of ITU-T SG16 WP3 and ISO/IEC JTC1/SC29/WG11, Document: JCTVC-H0239, 8th Meeting: San Jose, CA, USA, Feb. 1-10, 2012.

(56)                 References Cited

OTHER PUBLICATIONS

Thomas Wiegand, et al., "Overview of the H.264/AVC Video Coding Standard," IEEE Transactions on Circuits and Systems for Video Technology, vol. 13, No. 7, Jul. 2003, pp. 560-576 (17 pages, in English).

Toshiyasu Sugio et al., "Non-CE9/Non-CE13: Simplification on AMVP/Merge", Joint Collaborative Team on Video Coding (JCT-VC) of ITU-T SG16 WP3 and ISO/IEC JTC1/SC29/WG11, Document: JCTVC-G542, 7.sup.th Meeting: Geneva, CH, Nov. 21-30, 2011.

Toshiyasu Sugio et al., "Parsing Robustness for Merge/AMVP", Joint Collaborative Team on Video Coding (JCT-VC) of ITU-T SG16 WP3 and ISO/IEC JTC1/SC29/WG11, Document: JCTVC-F470, 6th Meeting: Torino, IT, Jul. 14-22, 2011.

Toshiyasu Sugio, et al., "Non-CE9: Simplified scaling calculation method for temporal/spatial MVP of AMVP/Merge," Proceedings of the 7.sup.th Meeting of the Joint Collaborative Team on Video Coding (JCT-VC) of Itu-T SG16 WP3 and Iso/Iec JTC1/SC29/WG11, Document: JCTVC-G541 Geneva, CH, Nov. 2011, pp. 1-5 (5 p. in English).

Zhao, et al., "Non-CE9: Simplification of AMVP," Joint Collaborative Team on Video Coding (JCT-VC) of ITU-T SG16 WP3 and ISO/IEC JTC1/SC29/WG11, version 2, Document: JCTVC-H0316, 8th Meeting: San Jose, US, Feb. 1-10, 2012 (3 pages).

Zhao, et al., "Simplified AMVP for High Efficiency Video Coding," IEEE, 2012 Visual Communications and Image Processing, 2012 (pp. 1-4).

Zhao, et al., Working Draft Changes to "Non-CE9: Simplification of AMVP," Joint Collaborative Team on Video Coding (JCT-VC) of ITU-T SG16 WP3 and ISO/IEC JTC1/SC29/WG11, version 2, Document: JCTVC-H0316, 8th Meeting: San Jose, US, Feb. 1-10, 2012 (3 pages, including a statement of relevance).

Zhuo et al., "A study on HM3.0 parsing throughput issue," Joint Collaborative Team on Video Coding (JCT-VC) of ITU-T SG16 WP3 and ISO/IEC JTC1/SC29/WG11, Document: JCTVC-F068, 6th Meeting: Torino, IT, Jul. 14-22, 2011.

English Translation of Technical Examination Report issued by the Brazil Patent Office for Application No. BR12 2020 017186-3 dated Oct. 11, 2022 (3 pages).

European Patent Office Extended Search Report for Application No. 22206419.8 dated Jan. 27, 2023 (6 pages).

* cited by examiner

START derive spatial motion vector candidate ——— S410 derive temporal motion vector candidate ——— S420 add induced motion vector candidate to
motion vector candidate list ——— S430 remove same motion vector candidate ——— S440 adjust motion vector candidate list by adding
specific motion vector or removing some ——— S450 determine prediction motion vector ——— S460

END

Motion vector candidate list number
of motion vector
candidates included in motion
vector candidate list < maximum
number of motion vector
candidates                                S910

No

Yes

Add (0,0) motion vector candidate                S920 derive two final motion
vector candidates

METHOD AND APPARATUS FOR IMAGE CODING/DECODING

CROSS-REFERENCE TO RELATED APPLICATIONS

This application is a continuation of U.S. patent application Ser. No. 17/903,494, filed Sep. 6, 2022, which is a continuation of U.S. patent application Ser. No. 17/214,040, filed Mar. 26, 2021, now U.S. Pat. No. 11,470,342, which is a continuation of U.S. patent application Ser. No. 16/829, 241, filed Mar. 25, 2020, now U.S. Pat. No. 11,006,142, which is a continuation of U.S. patent application Ser. No. 16/238,204, filed Jan. 2, 2019, now U.S. Pat. No. 10,638, 154, which is a continuation of U.S. patent application Ser. No. 14/372,816 having a 371(c) date of Jul. 17, 2014, now U.S. Pat. No. 10,218,999, which is a U.S. National Stage Application of International Application No. PCT/KR2013/ 000418, filed on Jan. 18, 2013, which claims the benefit under 35 USC 119(a) and 365(b) of Korean Patent Application No. 10-2013-0005655, filed on Jan. 18, 2013, and Korean Patent Application No. 10-2012-0006282, filed on Jan. 19, 2012, in the Korean Intellectual Property Office, the entire disclosures of which are incorporated herein by reference for all purposes.

FIELD OF THE INVENTION

The present invention concerns an image/video encoding/ decoding method and apparatus, and more specifically, to a motion vector prediction technology that may lower computation complexity.

BACKGROUND OF THE INVENTION

Recent spread of HD (High Definition) broadcast services nationwide and worldwide makes more users familiar with high-resolution, high-quality images/videos, and many organizations put more efforts to development of next-generation imaging devices. Further, more interest is oriented towards UHD (Ultra High Definition) having 4 times or more resolution than HDTV, as well as HDTV, so that image/ video compression technologies for higher-resolution, higher-quality images/videos are demanded.

For purposes of image/video compression, an inter prediction for predicting a pixel value included in a current image from a temporally previous and/or subsequent image, an intra prediction for predicting a pixel value included in a current image by using pixel information in the current image, and an entropy encoding for assigning a shorter code to a more frequent symbol while assigning a longer code to a less frequent symbol may be used.

SUMMARY OF THE INVENTION

An object of the present invention is to provide an image/video encoding method and apparatus that may enhance image/video encoding efficiency and may reduce computation complexity.

Another object of the present invention is to provide an image/video decoding method and apparatus that may enhance image/video encoding efficiency and may reduce computation complexity.

Still another object of the present invention is to provide a prediction block generating method and apparatus that may enhance image/video encoding efficiency and may reduce computation complexity.

Yet still another object of the present invention is to provide an inter prediction method and apparatus that may enhance image/video encoding efficiency and may reduce computation complexity.

Yet still another object of the present invention is to provide a motion vector prediction method and apparatus that may enhance image/video encoding efficiency and may reduce computation complexity.

DETAILED DESCRIPTION

To achieve the above objects, an image decoding method according to the present invention may comprise the steps of reconstructing a residual block by inverse-quantizing and inverse-transforming an entropy-decoded residual block, generating a prediction block by performing motion compensation, and reconstructing an image by adding the reconstructed residual block to the prediction block, in which a motion vector candidate list associated with the prediction block may be adjusted by adding a specific motion vector candidate or removing some of motion vector candidates based on the maximum number of motion vector candidates in the motion vector candidate list, and in which in the step of generating the prediction block, a prediction motion vector of the prediction block may be determined based on the adjusted motion vector candidate list The step of generating the prediction block may comprise the steps of configuring a motion vector candidate list by deriving a motion vector candidate associated with the prediction block, removing a same motion vector candidate of spatial motion vector candidates included in the motion vector candidate list, adjusting the motion vector candidate list by adding the specific motion vector candidate to the motion vector candidate list or removing some motion vector candidates from the motion vector candidate list, and determining a prediction motion vector among motion vector candidates included in the adjusted motion vector candidate list.

The step of adjusting the motion vector candidate list may comprise the step of, in a case where the number of motion vector candidates included in the motion vector candidate list is smaller than the maximum number of motion vector candidates, adding the specific motion vector candidate irrespective of whether a motion vector candidate is present in the motion vector candidate list or whether the specific motion vector candidate is present in the motion vector candidate list.

The step of adjusting the motion vector candidate list may comprise the step of, in a case where the number of motion vector candidates included in the motion vector candidate list is smaller than the maximum number of motion vector candidates, repeatedly adding the specific motion vector candidate until the number of motion vector candidates included in the motion vector candidate list reaches the maximum number of motion vector candidates.

The specific motion vector may be a (0, 0) motion vector, and the maximum number of motion vector candidates may be 2.

In a state where no motion vector candidate is present in the motion vector candidate list, two specific motion vectors are added.

In a state where one specific motion vector is present in the motion vector candidate list, one more specific motion vector may be added.

The step of adjusting the motion vector candidate list may comprise the step of, in a case where the number of motion vector candidates included in the motion vector candidate list is larger than the maximum number of motion vector candidates, removing, from the motion vector candidate list, a motion vector candidate having an index larger than the maximum number of motion vector candidates minus 1.

To achieve the objects, an image decoding apparatus according to the present invention may comprise a residual block reconstructing unit that reconstructs a residual block by inverse-quantizing and inverse-transforming an entropy-decoded residual block, a prediction block generating unit that generates a prediction block by performing motion compensation, and an image reconstructing unit that reconstructs an image by adding the reconstructed residual block to the prediction block, in which the prediction block generating unit adjusts a motion vector candidate list associated with the prediction block by adding a specific motion vector candidate or removing some of motion vector candidates based on the maximum number of motion vector candidates in the motion vector candidate list, and determines a prediction motion vector of the prediction block based on the adjusted motion vector candidate list.

The prediction block generating unit may comprise a motion vector candidate list configuring unit that configures a motion vector candidate list by deriving a motion vector candidate associated with the prediction block, a same motion vector candidate removing unit that removes a same motion vector candidate of spatial motion vector candidates included in the motion vector candidate list, a motion vector candidate list adjusting unit that adjusts the motion vector candidate list by adding the specific motion vector candidate to the motion vector candidate list or removing some motion vector candidates from the motion vector candidate list, and a motion vector determining unit that determines a prediction motion vector among motion vector candidates included in the adjusted motion vector candidate list.

In a case where the number of motion vector candidates included in the motion vector candidate list is smaller than the maximum number of motion vector candidates, the motion vector candidate list adjusting unit adds the specific motion vector candidate irrespective of whether a motion vector candidate is present in the motion vector candidate list or whether the specific motion vector candidate is present in the motion vector candidate list.

In a case where the number of motion vector candidates included in the motion vector candidate list is smaller than the maximum number of motion vector candidates, the motion vector candidate list adjusting unit repeatedly adds the specific motion vector candidate until the number of motion vector candidates included in the motion vector candidate list reaches the maximum number of motion vector candidates.

The specific motion vector may be a $(0, 0)$ motion vector, and in which the maximum number of motion vector candidates may be 2.

In a state where no motion vector candidate is present in the motion vector candidate list, two specific motion vectors are added.

In a state where one specific motion vector is present in the motion vector candidate list, one more specific motion vector may be added.

To achieve the objects, an image encoding method according to the present invention may comprise the steps of generating a prediction block by performing inter prediction or motion compensation on an input image and performing entropy encoding by transforming and quantizing a residual block that is a difference between a current input block and a prediction block predicted by the inter prediction, in which a motion vector candidate list associated with the prediction block may be adjusted by adding a specific motion vector candidate or removing some of motion vector candidates based on the maximum number of motion vector candidates in the motion vector candidate list, and in which in the step of generating the prediction block, a prediction motion vector of the prediction block may be determined based on the adjusted motion vector candidate list.

The step of generating the prediction block may comprise the steps of configuring a motion vector candidate list by deriving a motion vector candidate associated with the prediction block, removing a same motion vector candidate of spatial motion vector candidates included in the motion vector candidate list, adjusting the motion vector candidate list by adding the specific motion vector candidate to the motion vector candidate list or removing some motion vector candidates from the motion vector candidate list, and determining a prediction motion vector from the adjusted motion vector candidate list.

The step of adjusting the motion vector candidate list may comprise the step of, in a case where the number of motion vector candidates included in the motion vector candidate list is smaller than the maximum number of motion vector candidates, adding the specific motion vector candidate irrespective of whether a motion vector candidate is present in the motion vector candidate list or whether the specific motion vector candidate is present in the motion vector candidate list.

To achieve the objects, an image encoding method according to the present invention may comprise a prediction block generating unit that generates a prediction block by performing inter prediction or motion compensation on an input image and an encoding unit that performs entropy encoding by transforming and quantizing a residual block that is a difference between a current input block and a prediction block predicted by the inter prediction, in which the prediction block generating unit adjusts a motion vector candidate list associated with the prediction block by adding a specific motion vector candidate or removing some of motion vector candidates based on the maximum number of motion vector candidates in the motion vector candidate list, and determines a prediction motion vector of the prediction block based on the adjusted motion vector candidate list.

The image/video encoding method according to the present invention may reduce computation complexity and enhance image/video encoding efficiency.

The image/video decoding method according to the present invention may reduce computation complexity and enhance image/video encoding efficiency.

The prediction block generating method according to the present invention may reduce computation complexity and enhance image/video encoding efficiency.

The inter prediction method according to the present invention may reduce computation complexity and enhance image/video encoding efficiency.

The motion vector prediction method according to the present invention may reduce computation complexity and enhance image/video encoding efficiency.

MODE FOR INVENTION

Hereinafter, embodiments of the present invention will be described in detail with reference to the accompanying drawings. In describing the embodiments, when determined to make the gist of the invention unclear, the detailed description on the well-known configurations or functions will be omitted.

When a component is "connected to" or "coupled to" another component, the component may be directly connected or coupled to the other component, or other components may also intervene. Further, when a specific component is "included", other components are not excluded but may be included, and such configuration is also included in the scope of the invention.

The terms "first" and "second" may be used to describe various components, but the components are not limited thereto. These terms are used only to distinguish one component from another. For example, the first component may be also named the second component, and the second component may be similarly named the first component.

The constitutional parts in the embodiments are independently shown to represent different features, but this does not mean that each constitutional part is formed of a separate hardware unit or one software constitutional unit. That is, each constitutional part is separated from the others for ease of description. At least two of the constitutional parts may be combined into a single constitutional part, or one constitutional part may be divided into a plurality of constitutional parts which may perform functions, respectively. The embodiments covering the combinations of the constitutional parts or the separation thereof may be included in the scope of the invention without departing from the gist of the invention.

Some constitutional parts are not essential ones to perform the inevitable functions of the present invention but rather may be optional constitutional parts to enhance performance. The present invention may be implemented only by the constitutional parts necessary for realizing the gist of the invention or such a configuration that includes only the essential constitutional parts excluding the optional constitutional parts used for enhancing performance may also be included in the scope of the present invention.

Figure 1:
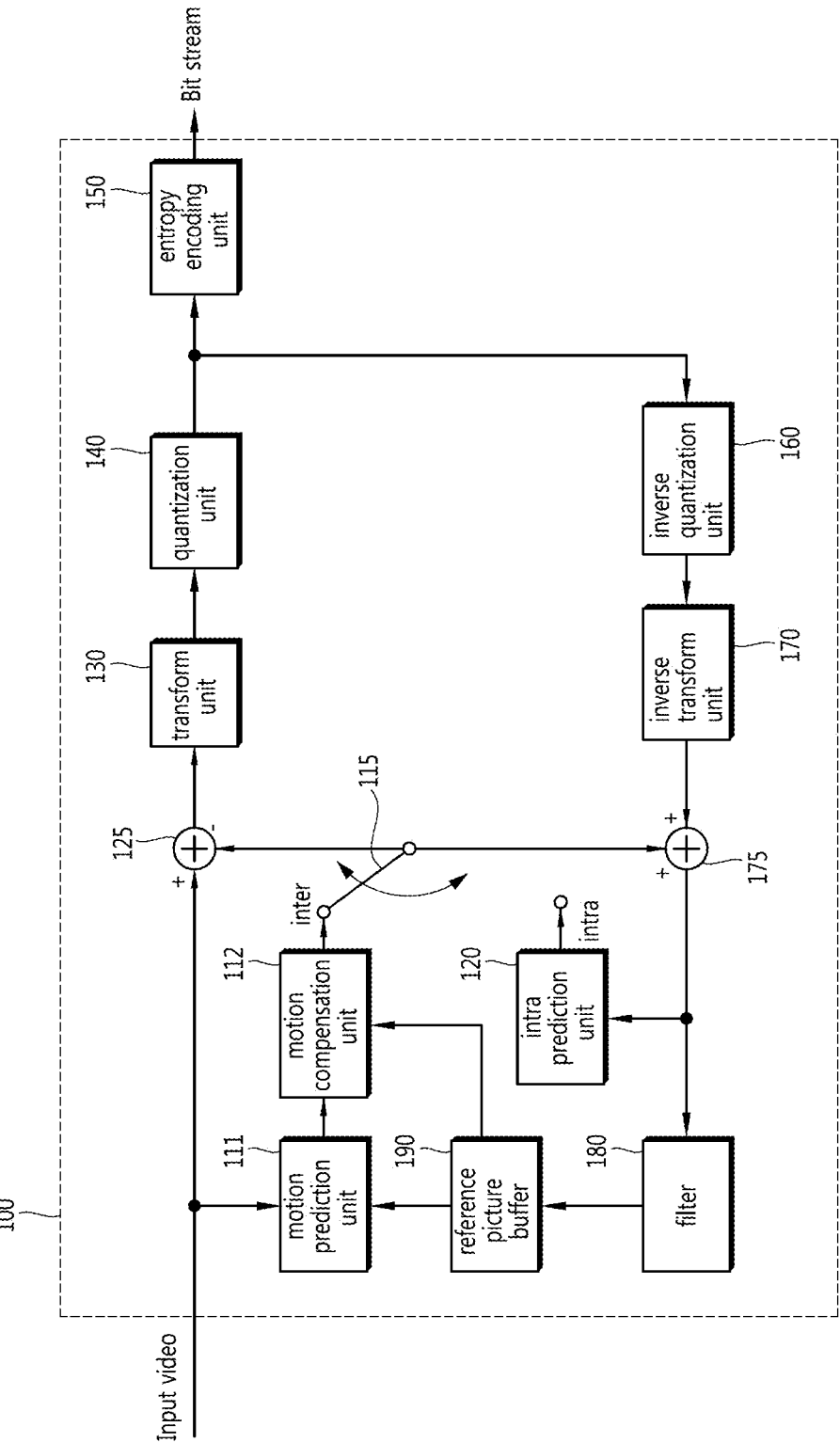
FIG. 1 is a block diagram illustrating a configuration of an image encoding apparatus according to an embodiment of the present invention.

FIG. 1 is a block diagram illustrating a configuration of an image encoding apparatus according to an embodiment of the present invention. Here, the "image" may be used to have the same meaning as the "picture" to be described below.

Referring to FIG. 1, the image encoding apparatus 100 includes a motion prediction unit 111, a motion compensation unit 112, an intra prediction unit 120, a switch 115, a subtractor 125, a transform unit 130, a quantization unit 140, an entropy encoding unit 150, an inverse quantization unit 160, an inverse transform unit 170, an adder 175, a filter unit 180, and a reference picture buffer 190.

The image encoding apparatus 100 may perform encoding on an input image in an intra mode or inter mode and may output a bit stream. The intra prediction means intra-picture prediction, and the inter prediction means inter-picture prediction. In the intra mode, the switch 115 may shift to intra, and in the inter mode, the switch 115 may shift to inter. The image encoding apparatus 100 may generate a prediction block on an input block of the input image and may then encoding a differential between the input block and the prediction block.

In the intra mode, the intra prediction unit 120 may generate a prediction block by performing spatial prediction using a pixel value of an already encoded block adjacent to a current block.

In the inter mode, the motion prediction unit 111 may obtain a motion vector by figuring out an area that best matches an input block of a reference picture stored in the reference picture buffer 190 during the course of motion prediction. The motion compensation unit 112 may generate a prediction block by performing motion compensation using a motion vector. Here, the motion vector is a 2D (two-dimensional) vector used for inter prediction, and may represent an offset between a current encoding/decoding target image and a reference picture.

The subtractor 125 may generate a residual block based on a differential between an input block and a generated prediction block. The transform unit 130 may perform transform on a residual block to output a transform coefficient. The quantization unit 140 may perform quantization on an input transform coefficient based on a quantization parameter to output a quantized coefficient.

The entropy encoding unit 150 may output a bit stream by performing entropy encoding based on values yielded from the quantization unit 140 or a motion vector difference, a reference picture index, a motion vector candidate index, and prediction direction information that are yielded during the course of encoding.

When entropy encoding applies, a fewer number of bits are assigned to a symbol having a higher probability of occurrence, while a more number of bits are assigned to a symbol having a lower probability of occurrence, so that the size of the bit stream for the encoding target symbols may be reduced. Accordingly, the compression performance of image encoding may be increased through entropy encoding. The entropy encoding unit 150 may adopt encoding schemes, such as exponential golomb, CAVLC (Context-Adaptive Variable Length Coding), CABAC (Context-Adaptive Binary Arithmetic Coding), for purposes of entropy encoding.

The image encoding apparatus according to the embodiment described in connection with FIG. 1 performs inter prediction encoding, i.e., inter-picture prediction encoding, and thus, the currently encoded image needs to be decoded and then stored to be able to be used as a reference picture. Accordingly, a quantized coefficient is inverse-quantized by the inverse quantization unit 160 and inverse-transformed by the inverse transform unit 170. The inverse-quantized, inverse-transformed coefficient is added to the prediction block by the adder 175, and thus, a reconstructed block is generated.

The reconstructed block passes through the filter unit 180 that may apply at least one or more of a deblocking filter, SAO (Sample Adaptive Offset), and ALF (Adaptive Loop Filter) to a reconstructed block or reconstructed image. The filter unit 180 may be also called an adaptive in-loop filter. The deblocking filter may remove a distortion that occurs at a boundary between blocks. The SAO may add a proper offset value to a pixel value so as to compensate for a coding error. The ALF may perform filtering based on a value obtained by comparing a reconstructed image with an original image. A reconstructed block which has passed through the filter unit 180 may be stored in the reference picture buffer 190.

Figure 2:
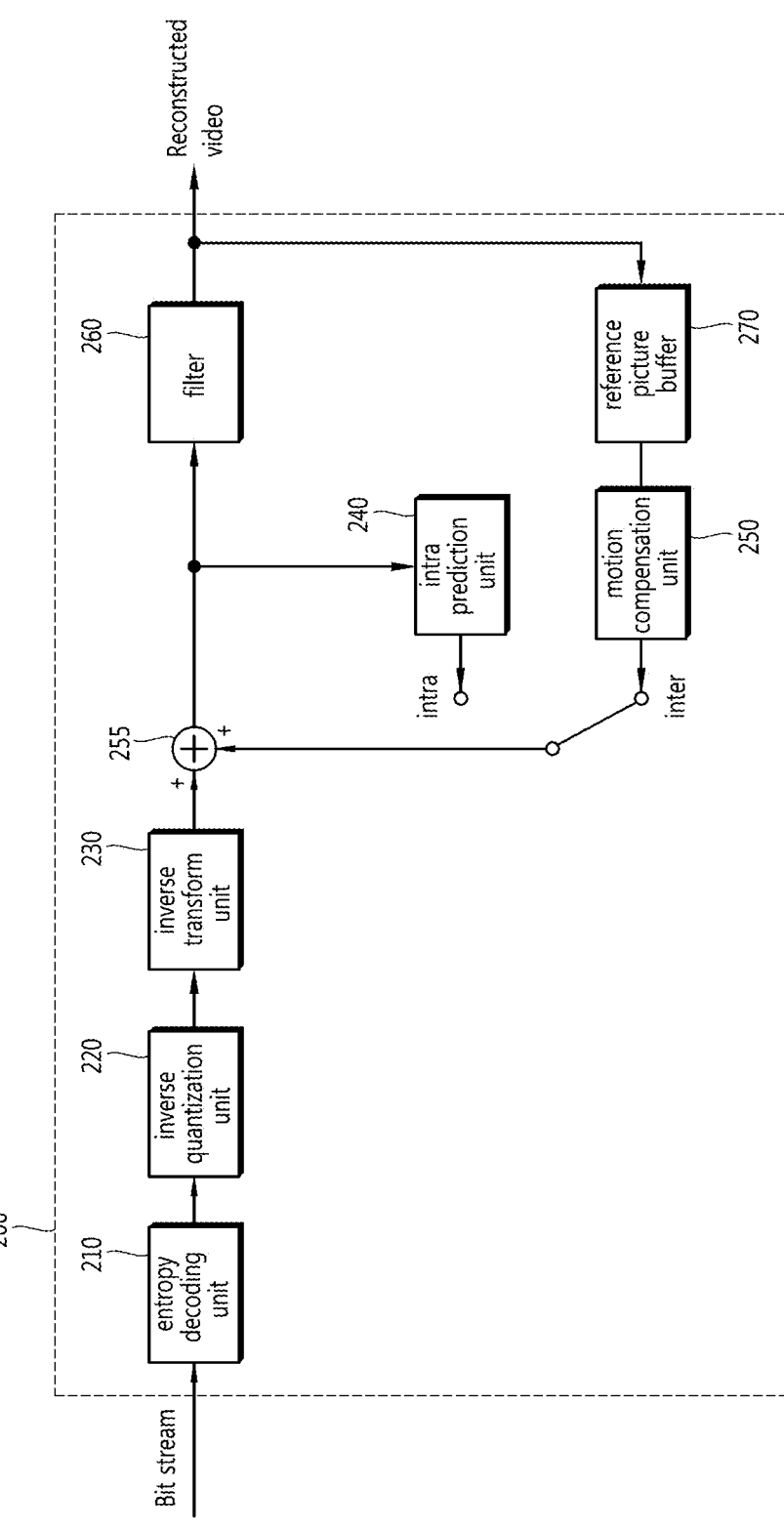
FIG. 2 is a block diagram illustrating a configuration of an image decoding apparatus according to an embodiment of the present invention.

FIG. 2 is a block diagram illustrating a configuration of an image decoding apparatus according to an embodiment of the present invention.

Referring to FIG. 2, the image decoding apparatus 200 includes an entropy decoding unit 210, an inverse-quantization unit 220, an inverse-transform unit 230, an intra prediction unit 240, a motion compensation unit 250, an adder 255, a filter unit 260, and a reference picture buffer 270.

The image decoding apparatus 200 may receive a bit stream output from an encoder, perform decoding in an intra mode or inter mode, and output a reconstructed image. In the intra mode, the switch may shift to intra, and in the inter mode, the switch may shift to inter. The image decoding apparatus 200 may obtain a reconstructed residual block from a received bit stream, generate a prediction block, and add the reconstructed residual block to the prediction block to thereby generate a reconstructed block.

The entropy decoding unit 210 may entropy-decode an input bit stream according to a probability distribution to thereby generate symbols including quantized coefficient types of symbols. Entropy decoding schemes are similar to the above-described entropy encoding schemes.

When an entropy decoding scheme applies, a less number of bits are assigned to a symbol having a higher probability of occurrence, with a more number of bits assigned to a symbol having a lower probability of occurrence, so that the size of the bit stream for each symbol may be reduced. Accordingly, compression performance of image decoding may be increased through the entropy decoding scheme.

A quantized coefficient may be inverse-quantized in the inverse-quantization unit 220, and inverse-transformed in the inverse-transform unit 230. As a result of inverse quantization/inverse transform of the quantized coefficient, a reconstructed residual block may be generated.

In the intra mode, the intra prediction unit 240 may generate a prediction block by performing spatial prediction using a pixel value of an already decoded block adjacent to a current block. In the inter mode, the motion compensation unit 250 may generate a prediction block by performing motion compensation using a reference picture stored in the reference picture buffer 270 and a motion vector.

The reconstructed residual block and prediction block are added to each other through the adder 255, and the resultant block may go through the filter unit 260. The filter unit 260 may apply at least one or more of a deblocking filter, SAO, and ALF to a reconstructed block or a reconstructed image. The filter unit 260 may output a reconstructed image. The reconstructed image may be stored in the reference picture buffer 270 and may be used for inter prediction.

Hereinafter, the "block" means a basis on which image encoding and decoding are carried out. Upon image encoding and decoding, a unit for encoding or decoding is the one split from an image for purposes of encoding or decoding, and thus, the block may be also referred to as a unit, a coding unit (CU), a prediction unit (PU), a transform unit (TU), etc. One unit may be further split into sub units having a smaller size. A prediction unit is a basis unit for performing inter prediction or motion compensation, and may be also referred to as a prediction block. A prediction unit may be split into a plurality of partitions, and the plurality of partitions are a basic unit for performing prediction, and a partition split from a prediction unit may be also referred to as a prediction unit. Further, as used herein, the "picture" may be also referred to as "image," "frame," "field," and/or "slice" according to context, and a distinction between each other may be easily made by those skilled in the art. For example, the "P picture," "B picture," and "forward-directional B picture" may be also referred to as "P slice," "B slice," and "forward-directional B slice," respectively. Further, as used herein, the "current block" may denote a block when performing inter prediction or motion compensation, and in such case, the current block may mean a prediction unit or prediction block.

Figure 3:
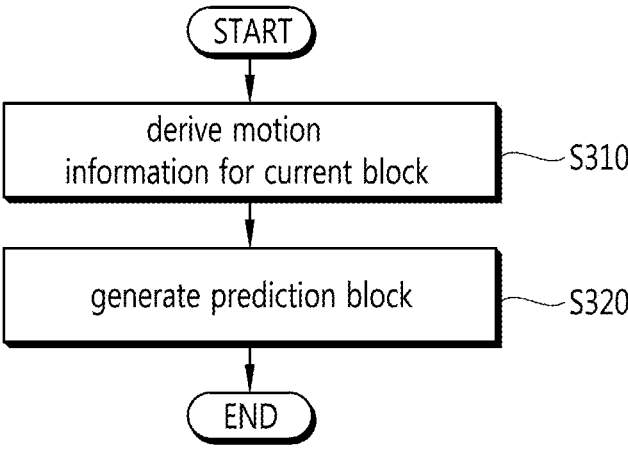
FIG. 3 is a flowchart schematically illustrating an inter prediction method according to an embodiment of the present invention.

FIG. 3 is a flowchart schematically illustrating an inter prediction method according to an embodiment of the present invention.

Referring to FIG. 3, an encoder and a decoder may derive motion information for a current block (S310).

In an inter mode, the encoder and decoder may derive the motion information of the current block and may then perform inter prediction and/or motion compensation based on the derived motion information. At this time, the encoder and decoder may enhance encoding efficiency by using motion information of a collocated block corresponding to the current block in an already reconstructed collocated picture and/or a reconstructed adjacent block. Here, the reconstructed adjacent block is a block in a current picture that is already encoded and/or decoded and reconstructed, and may include a block adjacent to the current block and/or a block positioned at a corner outside the current block. Further, the encoder and decoder may determine a predetermined relative position based on a block present at spatially the same position as the current block in the collocated picture and may produce the collocated block based on the determined predetermined relative position (a position in and/or outside a block present at spatially the same position as the current block). Here, as an example, the collocated picture may correspond to one picture among reference pictures included in a reference picture list. Further, the motion information, as used herein, means information necessary for inter prediction or motion compensation, which includes at least one of a motion vector, a reference picture index, a motion vector candidate index, a motion vector difference, a reference picture list, a prediction motion vector, a merge flag, a merge index, a prediction direction, and availability information.

Meanwhile, the motion information deriving scheme may vary depending on a prediction mode of a current block. As a prediction mode applicable to inter prediction, there may be a merge mode or motion vector prediction including AMVP (Advanced Motion Vector Prediction).

As an example, in case motion vector prediction applies, the encoder and decoder may generate a motion vector candidate list by using a motion vector of a collocated block and/or a motion vector of a reconstructed adjacent block. That is, the motion vector of the reconstructed adjacent block and/or the motion vector of the collocated block may be used as motion vector candidates. The encoder may transfer, to the decoder, a prediction motion vector index indicating the optimal prediction motion vector selected among motion vector candidates included in the list. At this time, the decoder may select a prediction motion vector of the current block among prediction motion vector candidates included in the motion vector candidate list using the prediction motion vector index.

The encoder may obtain a motion vector difference (MVD) between the motion vector of the current block and the prediction motion vector and may encode the motion vector difference and may transfer the encoded motion vector difference to the decoder. At this time, the decoder may decode the received motion vector difference and may derive the motion vector of the current block by adding the decoded motion vector difference to the prediction motion vector.

As another example, in case a merge mode applies, the encoder and decoder may generate a merge candidate list by using a collocated block and/or motion information of a reconstructed adjacent block. That is, in case there is motion information of the collocated block and/or the reconstructed adjacent block, the encoder and decoder may use it as a merge candidate for the current block.

The decoder may select a merge candidate that may provide the optimal encoding efficiency among merge candidates included in the merge candidate list as the motion information for the current block. At this time, a merge index indicating the selected merge candidate may be included in a bit stream and may be transmitted to the decoder. The decoder may select one of the merge candidates included in the merge candidate list by using the transmitted merge index and may determine the selected merge candidate as the motion information of the current block. Accordingly, in case the merge mode applies, the motion information of the collocated block and/or the reconstructed adjacent block may be used, as is, as the motion information of the current block.

In the above-described AMVP and merge mode, the motion information of the reconstructed adjacent block and/or the motion information of the collocated block may be used to derive the motion information of the current block. Hereinafter, in embodiments described below, the motion information derived from the reconstructed adjacent block is denoted as spatial motion information, and the motion information derived based on the collocated block is denoted as temporal motion information. For example, a motion vector derived from a reconstructed adjacent block may be referred to as a spatial motion vector, and a motion vector derived based on a collocated block may be referred to as a temporal motion vector.

Referring back to FIG. 3, the encoder and decoder may generate a prediction block by performing motion compensation on a current block based on the derived motion information (S320). Here, the prediction block may mean a motion-compensated block that is generated as a result of performing motion compensation on the current block. Further, a plurality of motion-compensated blocks may constitute one motion-compensated picture. Thus, in embodiments described below, the prediction block may be denoted as a "motion-compensated block," and/or "motion-compensated picture" according to context, and a distinction between the two may be easily made by those skilled in the art.

Meanwhile, as pictures to be subject to inter prediction, there may be a P picture and a B picture. The P picture may mean a picture subject to uni-directional prediction using one reference picture, and the B picture may mean a picture subjected to forward-directional, backward-directional, or bi-directional prediction using, e.g., two reference pictures. For example, the B picture may be subject to inter prediction using one forward-directional reference picture (past picture) and one backward-directional reference picture (future picture). Further, the B picture may also be subject to prediction using two forward-directional reference pictures or two backward-directional reference pictures.

Here, the reference pictures may be managed by a reference picture list. The reference picture used in the P picture may be assigned to a reference picture list 0 (L0 or List 0). The two reference pictures used in the B picture may be assigned to reference picture list 0 and reference picture list 1 (L1 or List 1), respectively. Hereinafter, reference picture list L0 may have the same meaning as reference picture list 0, and reference picture list L1 may have the same meaning as reference picture list 1.

In general, a forward-directional reference picture may be assigned to reference picture list 0, and a backward-directional reference picture may be assigned to reference picture list 1. However, the method of assigning a reference picture is not limited thereto, and a forward-directional reference picture may be assigned to reference picture list 1 while a backward-directional reference picture may be assigned to reference picture list 0. Hereinafter, a reference picture assigned to reference picture list 0 is referred to as an L0 reference picture, and a reference picture assigned to reference picture list 1 is referred to as an L1 reference picture.

The reference pictures may be generally assigned to the reference picture list in a descending order according to reference picture numbers. Here, the reference picture number may mean a number assigned to each reference picture in the order of POC (Picture Order Count). The POC order may mean a time order and/or a display order of a picture. For example, two reference pictures having the same POC number may correspond to the same reference picture. Reference pictures assigned to the reference picture list may be rearranged by reference picture list modification.

As described above, uni-directional prediction using one L0 reference picture may be performed on the P picture, and forward-directional, backward-directional, or bi-directional prediction using one L0 reference picture and one L1 reference picture, i.e., two reference pictures, may be performed on the B picture. Prediction using one reference picture may be referred to as uni-prediction, and prediction using two reference pictures including a L0 reference picture and a L1 reference picture may be referred to as bi-prediction.

The bi-prediction may have a concept of including all of the forward-directional prediction, backward-directional prediction and bi-directional prediction, but for ease of description, in embodiments described below, prediction using two reference pictures (L0 reference picture and L1 reference picture) is referred as to bi-directional prediction. That is, in embodiments described below, the bi-directional prediction may mean bi-prediction, and may be understood to have a concept of including all of the forward-directional, backward-directional, and bi-directional prediction using two reference pictures (L0 reference picture and L1 reference picture). Further, even in case bi-prediction is performed, forward-directional prediction or backward-directional prediction may be performed, but in embodiments described below, prediction using one reference picture alone is referred to as uni-directional prediction, for ease of description. In other words, in embodiments described below, uni-directional prediction may mean a uni-prediction, and should be understood to have a concept of including prediction using only one reference picture. Further, information indicating whether uni-directional prediction (uni-prediction) or bi-directional prediction (bi-prediction) applies to a block is hereinafter referred to as prediction direction information.

Figure 4:
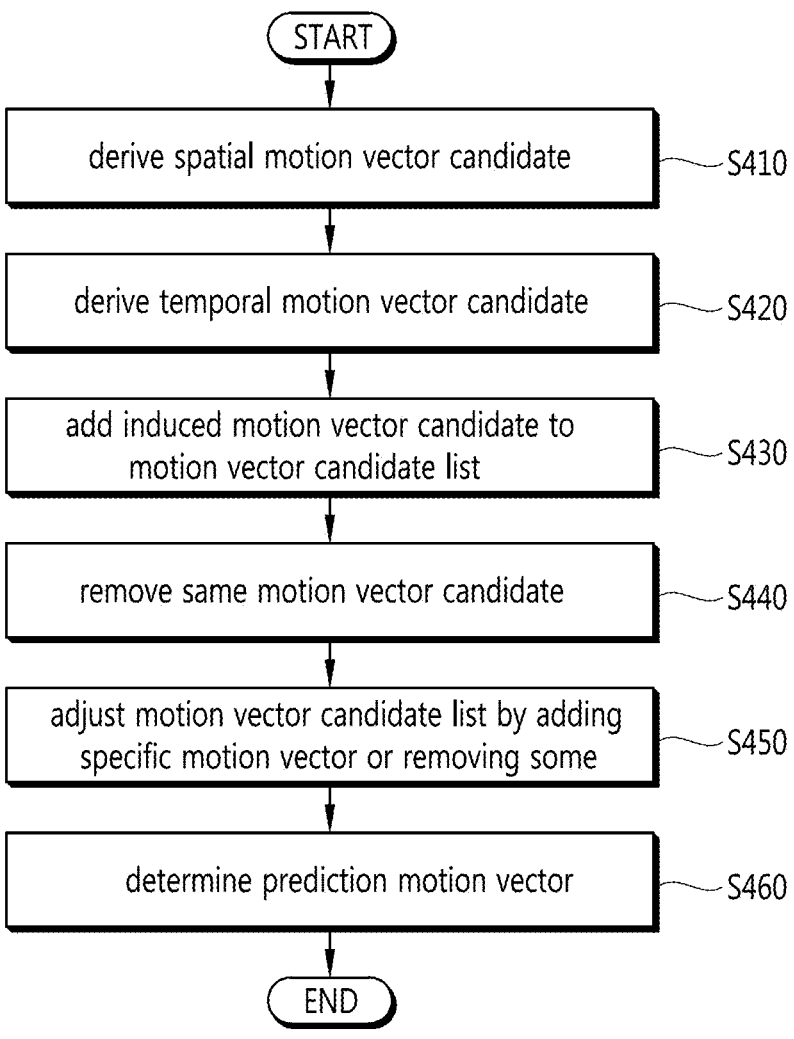
FIG. 4 is a flowchart illustrating a process of deriving a motion vector candidate to determine a prediction motion vector in an image encoding/decoding apparatus according to an embodiment of the present invention.

FIG. 4 is a flowchart illustrating a process of deriving a motion vector candidate to determine a prediction motion vector in an image encoding/decoding apparatus according to an embodiment of the present invention.

Referring to FIG. 4, the encoder and decoder first derive a spatial motion vector candidate in order to determine a prediction motion vector (S410). The encoder and decoder may derive, as a spatial motion vector candidate, a motion vector candidate from a block (reference block) already reconstructed spatially adjacent to a current block as described above. At this time, as many spatial motion vector candidates as the maximum number of spatial motion vector candidates, maxNumSpatialMVPCand, may be derived. In case a reference picture of a reconstructed adjacent block is different from a reference picture of the current block, scaling may be carried out to derive a spatial motion vector candidate.

The encoder and decoder derive a temporal motion vector candidate (S420). The encoder and decoder may derive a motion vector candidate from a collocated block reconstructed in a collocated picture temporally adjacent to a current block. Further, as many temporal motion vector candidates as the maximum number of temporal motion vector candidates, maxNumTemporalMVPCand, may be derived. Further, in case a distance between a current picture and a reference picture of a current block is different from a distance between a collocated picture and a reference picture of a collocated block, scaling may be carried out to derive a temporal motion vector candidate.

If the deriving of a spatial motion vector candidate or temporal motion vector candidate is done, a derived motion vector candidate is added to a motion vector candidate list (S430). That is, the encoder and decoder may add spatial motion vector candidates and temporal motion vector candidates to the motion vector candidate list (mvpListLX) in an order. The motion vector candidate list (mvpListLX) means a motion vector candidate list corresponding to one of reference picture lists L0 and L1, and for example, a motion vector candidate list corresponding to reference picture list L0 may be represented as mvpListL0.

After the motion vector candidate list is configured, the encoder and decoder remove the same motion vector candidate (S440). It is verified whether there are motion vector candidates having the same motion vector value in the motion vector candidate list (mvpListLX). For example, if a plurality of spatial motion vector candidates are in the list, among spatial motion vector candidates that are identical to one another, a spatial motion vector candidate having the smallest motion vector candidate index is left while the other spatial motion vector candidates are removed from the motion vector candidate list. In other words, in case there are a plurality of candidates having the same motion vector value, only one of the candidates having the same motion vector value may be left in the motion vector candidate list. The number of motion vector candidates to be removed may be one.

Then, the encoder and decoder add or remove some of specific motion vectors to thereby adjust the motion vector candidate list (S450). The encoder and decoder may adjust the size of the motion vector candidate list by adding a motion vector to the motion vector candidate list mvpListLX) or by removing some of the motion vector candidates included in the motion vector candidate list. The number of motion vector candidates to be removed may be one. At this time, a specific motion vector may be added without verifying whether a motion vector candidate is present in the motion vector candidate list based on the maximum number of motion vector candidates (maxNumMVPCand). Further, without verifying whether a specific motion vector candidate is present in the motion vector candidate list, a specific motion vector candidate may be added to adjust the number of motion vector candidates in the motion vector candidate list. At this time, the added specific motion vector may be a vector having a fixed integer or in some cases, may be a (0, 0) motion vector. Here, the (0, 0) motion vector means a motion vector in which x and y components are both 0, and may be also denoted as 0 motion vector (zero motion vector).

Finally, the encoder and decoder may determine a prediction motion vector based on the adjusted motion vector candidate list (S460).

Figure 5:
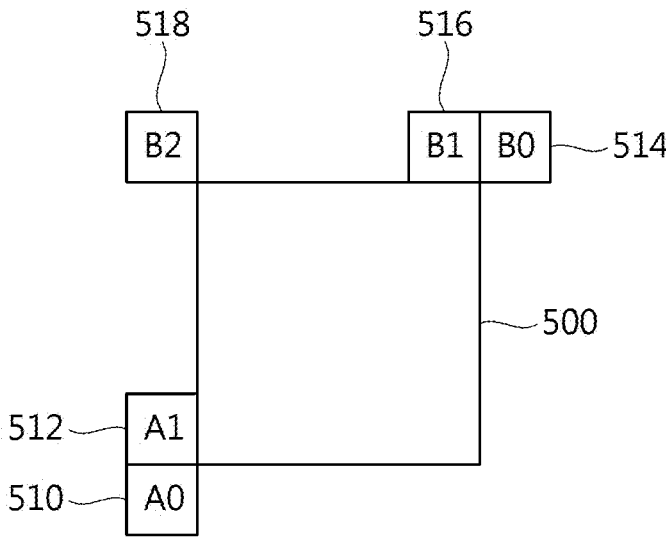
FIG. 5 is a view schematically illustrating a process of deriving a spatial motion vector candidate according to an embodiment of the present invention.

FIG. 5 is a view schematically illustrating a process of deriving a spatial motion vector candidate according to an embodiment of the present invention.

Referring to FIG. 5, the encoder and decoder determine whether there is motion information of reconstructed adjacent blocks 510, 512, 514, 516, and 518 to derive a spatial motion vector candidate of a current block 500. In case there is no motion information of the reconstructed adjacent blocks, they may be determined to be unavailable for motion vector candidates.

According to an embodiment of the present invention, the encoder and decoder may derive spatial motion vectors from an AO block 510 positioned at a left and lower corner of the current block 500, an A1 block 512 adjacent to a left and lowermost side of the current block 500, a B0 block 514 positioned at a right and upper corner of the current block 500, a B1 block 516 adjacent to an upper and rightmost side of the current block 500, and a B2 block 518 positioned at a left and upper corner of the current block 500 and may determine it as a spatial motion vector candidate of the current block 500.

At this time, each of the blocks may be determined to have a motion vector in the order of A0, A1, B0, B1, and B2 blocks 510, 512, 514, 516, and 518. In case there is a motion vector, the motion vector of the corresponding block may be determined as a motion vector candidate. As many spatial motion vector candidates as the maximum number of spatial motion vector candidates, maxNumSpatialMVPCand, may be derived. In such case, the maximum number of spatial motion vector candidates, maxNumSpatialMVPCand, is a positive integer including 0. According to an embodiment of the present invention, the maximum number of spatial motion vector candidates, maxNumSpatialMVPCand, may be 2. Accordingly, one motion vector candidate is derived from the A0 block 510 and A1 block 512, and one motion vector candidate is derived from the B0 block 514, B1 block 516, and B2 block 518, so that a total of two spatial motion vectors are derived. Simultaneously, in case the motion vector derived from the A0 block 510 and A1 block 512 is not the same as the motion vector derived from the B0 block 514, B1 block 516, and B2 block 518, the process of deriving a temporal motion vector candidate may be not performed. Further, in case a reference picture of the reconstructed adjacent block is different from a reference picture of the current block 500, the motion vector of the adjacent block may be scaled based on a difference between the reference picture of the current block 500 and the reference picture of the reconstructed adjacent block, and may be then used.

According to another embodiment of the present invention, the following scheme may be followed to derive a spatial motion vector from a reconstructed adjacent block:

1) in case a block is present at a predetermined position, the corresponding block is not subjected to intra encoding, and a reference picture list and a reference picture of the corresponding block are the same as a reference picture list and a reference picture of a current block, a motion vector of the corresponding block may be derived as a motion vector candidate of the current block.

2) in case a block is present at a predetermined position, the corresponding block is not subjected to intra encoding, and a reference picture list of the corresponding block is different from a reference picture list of a current block, but a reference picture of the corresponding block is the same as a reference picture of the current block, a motion vector of the corresponding block may be derived as a motion vector candidate of the current block.

3) in case a block is present at a predetermined position, the corresponding block is not subjected to intra encoding, and a reference picture list of the corresponding block is the same as a reference picture list of a current block, but a reference picture of the corresponding block is different from a reference picture of the current block, a motion vector of the corresponding block may be subjected to scaling and may be then derived as a motion vector candidate of the current block.

4) in case a block is present at a predetermined position, the corresponding block is not subjected to intra encoding, and a reference picture list and a reference picture of the corresponding block are different from a reference picture list and a reference picture of a current block, a motion vector of the corresponding block may be subjected to scaling and may be then derived as a motion vector candidate of the current block.

Based on the processes 1) to 4) above, the encoder and decoder may sequentially perform processes 1) and 2) on the A0 block 510, processes 1) and 2) on the A1 block 512, processes 3) and 4) on the A0 block 510, processes 3) and 4) on the A1 block 512, processes 1) and 2) on the B0 block 514, processes 1) and 2) on the B1 block 516, processes 1) and 2) on the B2 block 518, processes 3) and 4) on the B0 block 514, processes 3) and 4) on the B1 block 516, and processes 3) and 4) on the B2 block 518.

Figure 6:
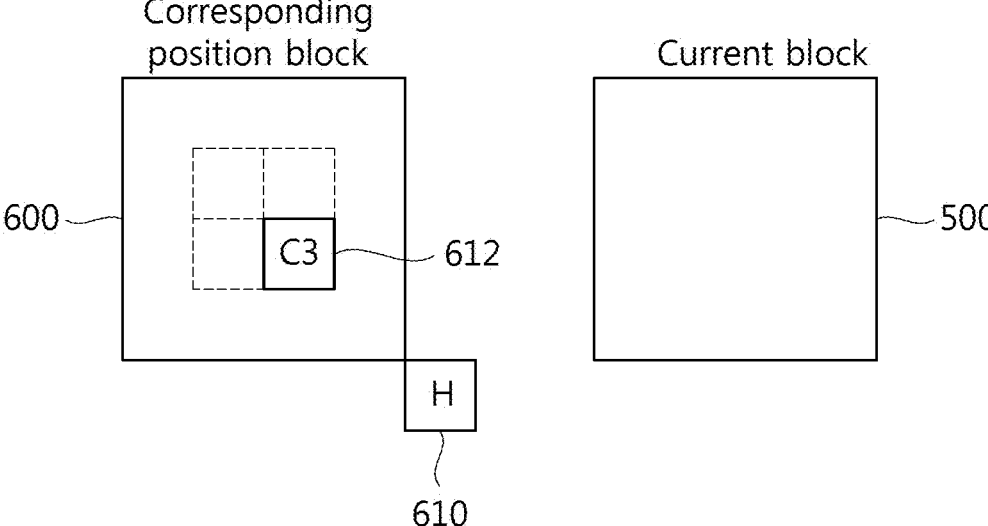
FIG. 6 is a view schematically illustrating a process of deriving a temporal motion vector candidate according to an embodiment of the present invention.

FIG. 6 is a view schematically illustrating a process of deriving a temporal motion vector candidate according to an embodiment of the present invention.

Referring to FIG. 6, the encoder and decoder may derive a motion vector candidate from a collocated block (or collocated block, 600) reconstructed in a collocated picture (or collocated picture) temporally adjacent to the current block 500.

According to an embodiment of the present invention, temporal motion vector candidates may be derived in the order of a block 610 present at position H, which is positioned outside a collocated block 600 corresponding to spatially the same position as the current block 500 in the collocated picture of the current picture and a block 612 present at position C3, which is positioned in the collocated block 600. At this time, in case motion vector may be derived from the H block 610, a temporal motion vector is derived from the H block 610, and in case no motion vector may be derived from the H block 610, a temporal motion vector candidate may be derived from the C3 block 612.

Here, the H block 610 may be a block positioned at a right and lower corner of the collocated block 600, and the C3 block may be a block positioned at a right and lower side among blocks obtained by quadrisecting a square with respect to the center of the collocated block 600. A temporal motion vector may be determined depending on a relative position of the H block 610 and the C3 block 612. If the H block 610 and C3 block are subjected to intra encoding, no temporal motion vector candidate may be derived.

Further, as many temporal motion vector candidates as the maximum number of temporal motion vector candidates, maxNumTemporalMVPCand, may be derived. At this time, the maximum number of temporal motion vector candidates, maxNumTemporalMVPCand, is a positive integer including 0, and as an example, the maximum number of temporal motion vector candidates, maxNumTemporalMVPCand, may be 1. In case a distance between a current picture and a reference picture of the current block 500 is different from a distance between a collocated picture and a reference picture of the collocated block 600, scaling may be performed on the motion vector, thereby deriving a temporal motion vector candidate.

The scaling may be performed in the following process.

First, td indicating a POC (Picture Order Count) difference between a collocated picture and a reference picture of the H block 610 or C3 block 612 and tb indicating a POC difference between the current picture and a reference picture of a current block are first obtained. At this time, in the process of deriving a spatial motion vector candidate, td denotes a difference in POC between the current picture and a reference picture referred to by a spatially adjacent reference block, and tb denotes a difference in POC between the current picture and a reference picture referred to by the current block. At this time, the reference picture of the current block and the reference picture of the reference block may have different prediction directions, and in such case, td and tb may be assigned with different signs. In some cases, td or tb may be adjusted to be included in a range from −128 to 127. At this time, if td or tb is smaller than −128, td or tb may be adjusted to −128, and if td or tb is larger than 127, td or tb may be adjusted to 127. If td or tb is included in a range from −128 to 127, td or tb is not subjected to adjustment.

After td and tb are obtained, tx which is an inverse-proportional value of td is yielded. This may be determined using equation: $(16384+(\mathrm{Abs}(td)\gg 1))/td$. Here, $\mathrm{Abs}(\ )$ represents an absolute value of an input value.

Then, a scaling factor, DistScaleFactor, is determined based on equation, $(tb*tx+32)\gg 6$, and is adjusted to be included in a range between −1024 and 1023.

With the adjusted DistScaleFactor value and equation, Sign(DistScaleFactor*mvCol)*((Abs (DistScaleFactor*mvCol)+127)>>8), a scaled temporal motion vector may be obtained. At this time, Sign( ) outputs information on the sign of an input value, and mvCol represents a temporal motion vector before scaling.

Figure 7:
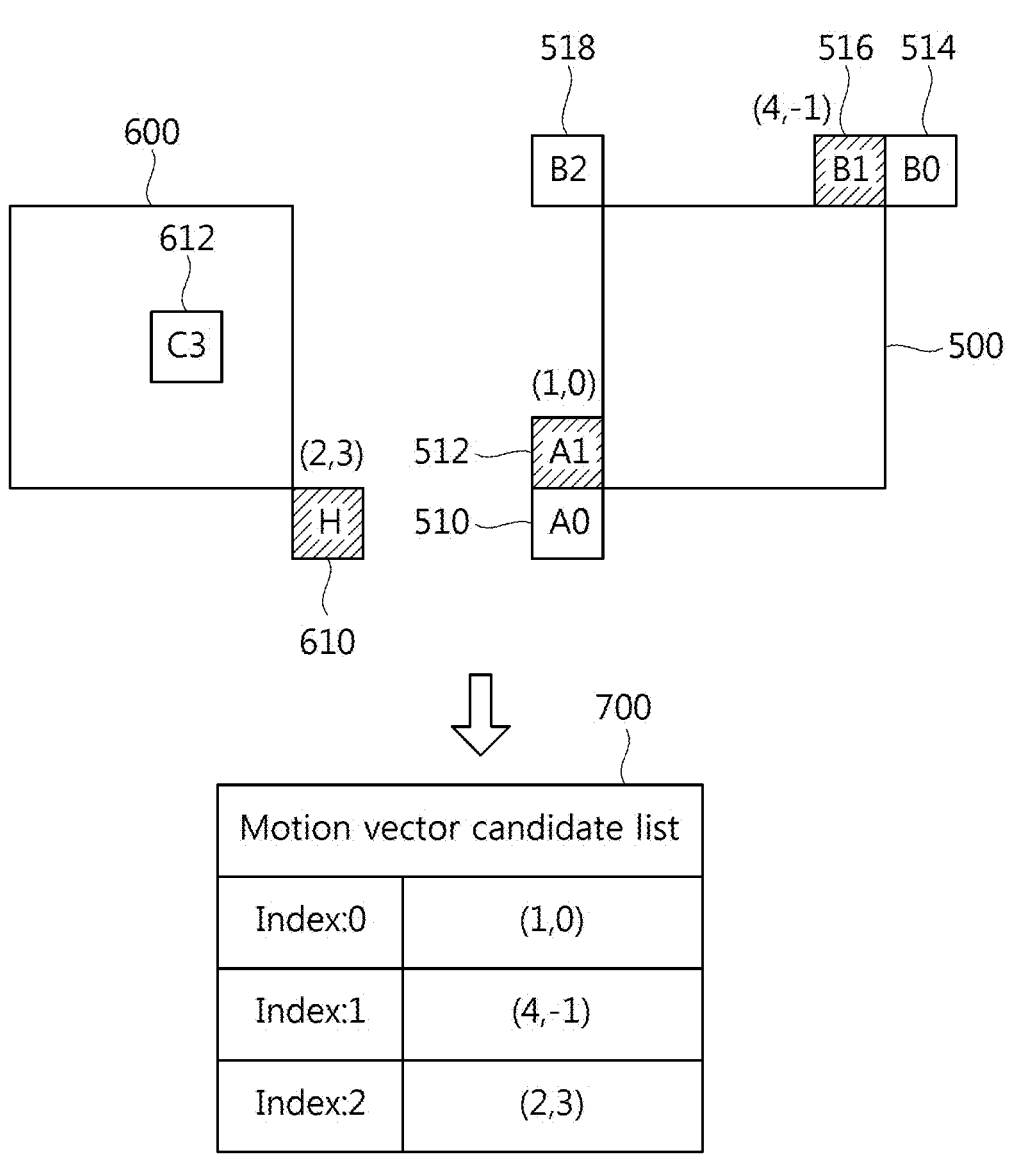
FIG. 7 is a view schematically illustrating an embodiment of configuring a motion vector candidate list based on derived motion vectors.

FIG. 7 is a view schematically illustrating an embodiment of configuring a motion vector candidate list based on derived motion vectors.

Referring to FIG. 7, the encoder and decoder add a derived motion vector candidate to a motion vector candidate list mvpListLX. The encoder and decoder add derived spatial motion vector candidates and temporal motion vector candidates to the motion vector candidate list in an order. mvpListLX means a motion vector candidate list corresponding to one of reference picture lists L0 and L1. For example, a motion vector candidate list corresponding to reference picture list L0 may be represented as mvpListL0.

The size of the motion vector candidate list mvpListLX may be determined based on a predetermined number, e.g., the maximum number of motion vector candidates, max NumMVPCand. At this time, the maximum number of motion vector candidates, maxNumMVPCand, may be 2. In case the maximum number of motion vector candidates is 3, and the number of derived motion vector candidates is 3, a motion vector candidate to be first added to the motion vector candidate list mvpListLX may have a motion vector candidate index of 0, and a motion vector candidate to be last added to the list may have a motion vector index of 2.

According to the embodiment described in connection with FIG. 7, if a non-scaled spatial motion vector candidate (1, 0) is derived from the A1 block 512, a scaled spatial motion vector candidate (4, −1) is derived from the B1 block 516, and a temporal motion vector candidate (2, 3) is derived from the H block 610, the motion vector candidates are added to the motion vector candidate list 700 in the order. At this time, the index of the motion vector candidate derived from the A1 block 512 may be 0, the index of the motion vector candidate derived from the B1 block 516 may be 1, and the index of the motion vector candidate derived from the H block 610 may be 2. In the embodiment, assuming the maximum number of motion vector candidates is 2, the motion vector candidates derived from the A1 block 512 and the B1 block 516 are not the same as each other, and thus, motion vector candidates derived from the A1 block 512 and the B1 block 516 are added to the motion vector candidate list without deriving a temporal motion vector candidate.

Figure 8:
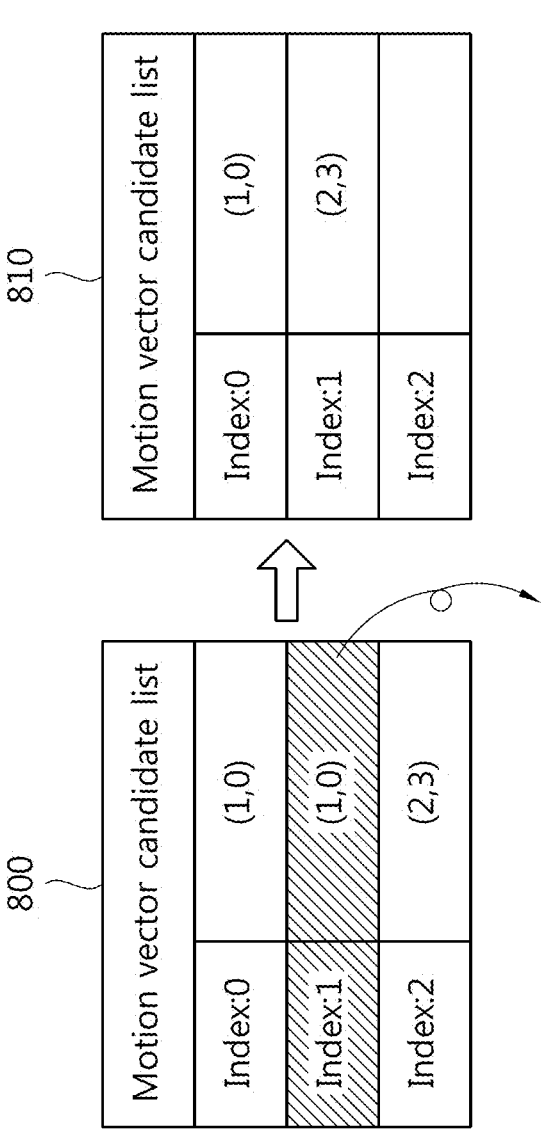
FIG. 8 is a view schematically illustrating an embodiment of removing motion vectors that are the same as each other from a motion vector candidate list.

FIG. 8 is a view schematically illustrating an embodiment of removing motion vectors that are the same as each other from a motion vector candidate list.

Referring to FIG. 8, the encoder and decoder verifies whether the same motion vector candidates are in the motion vector candidate list 800. If a result of the verification shows there are a plurality of same motion vector candidates, the encoder and decoder leave a motion vector candidate having the smallest motion vector candidate index among the same motion vector candidates while removing the others from the motion vector candidate list 800. At this time, the operation of removing the same motion vector candidate may be carried out only on spatial motion vector candidates.

According to the embodiment described in connection with FIG. 8, in case the motion vector candidate list 800 consists of three motion vector candidates (1, 0), (1, 0), and (2, 3) candidates corresponding to indices 0 and 1 are the same as each other as having (1, 0). In case there are the same motion vectors, the encoder and decoder leave only a motion vector candidate having the smallest index among the same motion vector candidates in the motion vector candidate list 810 while removing the other motion vector candidates, as in the reconfigured motion vector candidate list 810.

Figure 9:
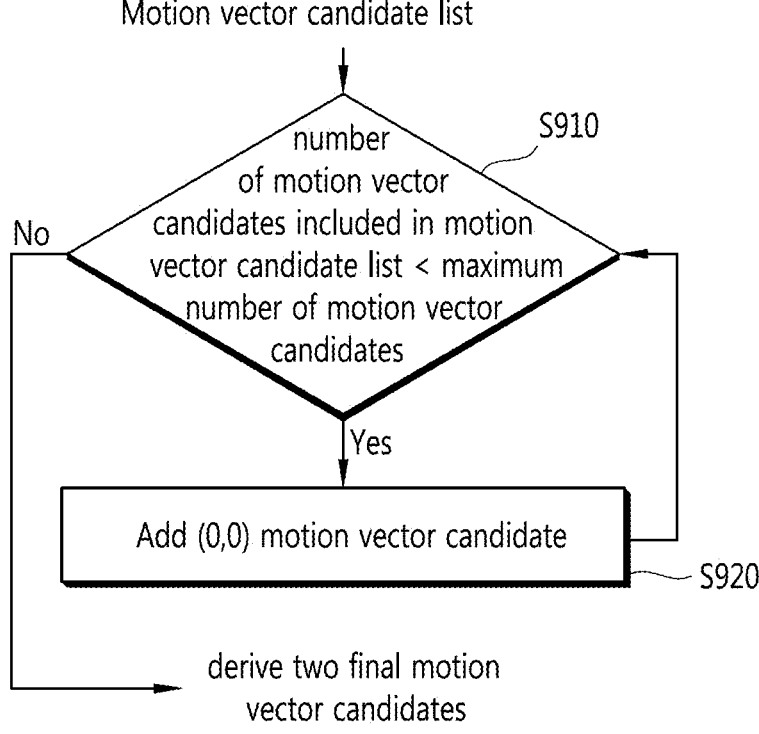
FIG. 9 is a flowchart schematically illustrating a process of adjusting a motion vector candidate list according to an embodiment of the present invention.

FIG. 9 is a flowchart schematically illustrating a process of adjusting a motion vector candidate list according to an embodiment of the present invention.

Referring to FIG. 9, the encoder and decoder determine whether the number of motion vector candidates included in the motion vector candidate list, numMVPCandLX, is smaller than the maximum number of motion vector candidates, maxNumMVPCand (S910). In case the number of motion vector candidates included in the motion vector candidate list, numMVPCandLX is smaller than the maximum number of motion vector candidates, maxNumMVP-Cand, (0, 0) motion vector is added to the motion vector candidate list (S920). If the (0, 0) motion vector is added to the motion vector candidate list, the number of motion vector candidates included in the motion vector candidate list, numMVPCandLX, may be increased by 1. After the (0, 0) motion vector is added, the operation of determining whether the number of motion vector candidates included in the motion vector candidate list, numMVPCandLX, is the smaller than the maximum number of motion vector candidates, maxNumMVPCand and adding a (0, 0) motion vector is repeated until the number of motion vector candidates included in the motion vector candidate list, numMVPCandLX, reaches the maximum number of motion vector candidates, maxNumMVPCand. That is, the above process may be performed until the number of motion vector candidates included in the motion vector candidate list, numMVPCandLX, is the same as the maximum number of motion vector candidates, maxNumMVPCand.

However, according to another embodiment of the present invention, in case the number of motion vector candidates included in the motion vector candidate list, numMVPCandLX, is smaller than the maximum number of motion vector candidates, maxNumMVPCand, only one (0, 0) motion vector may be added.

Resultantly, the number of motion vector candidates included in the motion vector candidate list may be determined depending on the maximum number of motion vector candidates.

According to an embodiment of the present invention, in case the number of motion vector candidates included in the motion vector candidate list, numMVPCandLX, is larger than the maximum number of motion vector candidates, maxNumMVPCand, some of the motion vector candidates may be removed to adjust the motion vector candidate list. At this time, motion vector candidates to be removed may be motion vector candidates having an index that is larger than the maximum number of motion vector 1, candidates, max NumMVPCand, minus (maxNumMVPCand−1). Further, in case the number of motion vector candidates included in the motion vector candidate list, numMVPCandLX, is the same as the maximum number of motion vector candidates, maxNumMVPCand, final motion vector candidates are derived. At this time, in case the maximum number of motion vector candidates, maxNumMVPCand, is 2, a maximum of two motion vector candidates may be finally derived. At this time, the derived motion vector candidates may be included in the motion vector candidate list, and one of the derived motion vector candidates may be determined as a prediction motion vector of the prediction block.

According to another embodiment of the present invention, in case the number of motion vector candidates included in the motion vector candidate list, numMVPCandLX, is larger than or equal to the maximum number of motion vector candidates, maxNumMVPCand, some of the motion vector candidates may be removed to adjust the motion vector candidate list. Likewise, in case the number of motion vector candidates included in the motion vector candidate list, numMVPCandLX, is the same as the maximum number of motion vector candidates, maxNumMVP-Cand, removal of motion vector candidates is not needed. Accordingly, only when the number of motion vector candidates included in the motion vector candidate list, numMVPCandLX, is larger than the maximum number of motion vector candidates, maxNumMVPCand, some of the motion vector candidates may be removed to adjust the motion vector candidate list.

Since only comparison between the number of motion vector candidates included in the motion vector candidate list and the maximum number of motion vector candidates is performed through the above process to thereby add a motion vector candidate to the motion vector candidate list, there is no need to perform duplicate check on whether a specific motion vector candidate ((0, 0) motion vector) to be added is present in the motion vector candidate list, thus leading to a reduction in computation complexity when performing motion vector prediction.

Further, only comparison between the number of motion vector candidates included in the motion vector candidate list and the maximum number of motion vector candidates is performed, and thus, there is no need of performing a list empty check for checking whether there is a motion vector in the motion vector candidate list, which is otherwise conducted in the midst of configuring the motion vector candidate list, thus resulting in a further decrease in computation complexity.

Figure 10:
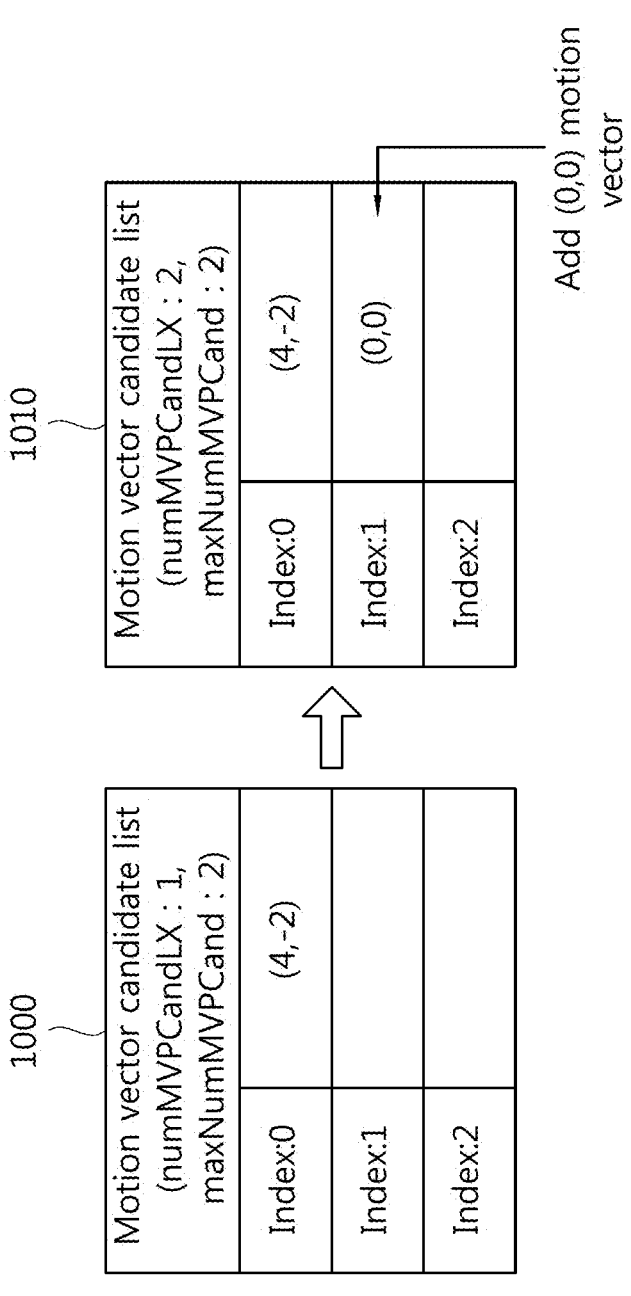
FIG. 10 is a view schematically illustrating an embodiment of adding a (0, 0) motion vector in case one motion vector candidate is present in a motion vector candidate list.

FIG. 10 is a view schematically illustrating an embodiment of adding a (0, 0) motion vector in case one motion vector candidate is present in a motion vector candidate list.

The encoder and decoder may adjust the size of the motion vector candidate list by adding a motion vector to the motion vector candidate list mvpListLX or removing some motion vector candidates. Here, numMVPCandLX means the number of motion vector candidates in a motion vector candidate list corresponding to one of reference pictures L0 and L1, and the size of the maximum motion vector candidate list may be determined depending on a predetermined number, e.g., the maximum number of motion vector candidates, maxNumMVPCand. For example, the number of motion vector candidates included in the motion vector candidate list corresponding to the reference picture list L0 may be represented as numMVPCandL0. At this time, numMVPCandLX and maxNumMVPCand may be a positive integer including 0, and in an embodiment, maxNumMVPCand may be 2.

Referring to FIG. 10, in an embodiment of the present invention, in case the maximum number of motion vector candidates, maxNumMVPCand, is 2, the number of motion vector candidates included in the motion vector candidate list 1000, numMVPCandLX, is 1, and thus, the number of motion vector candidates included in the motion vector candidate list 1000, numMVPCandLX, is smaller than the maximum number of motion vector candidates, maxNumMVPCand, a specific motion vector may be added to the motion vector candidate list 1000, thereby increasing the number of motion vector candidates included in the motion vector candidate list, numMVPCandLX, by 1. Accordingly, a motion vector candidate list 1010 with the specific motion vector added so that the size has been adjusted may be generated. At this time, the added specific motion vector may be a vector having a predetermined fixed integer and may be, e.g., (0, 0) motion vector.

Figure 11:
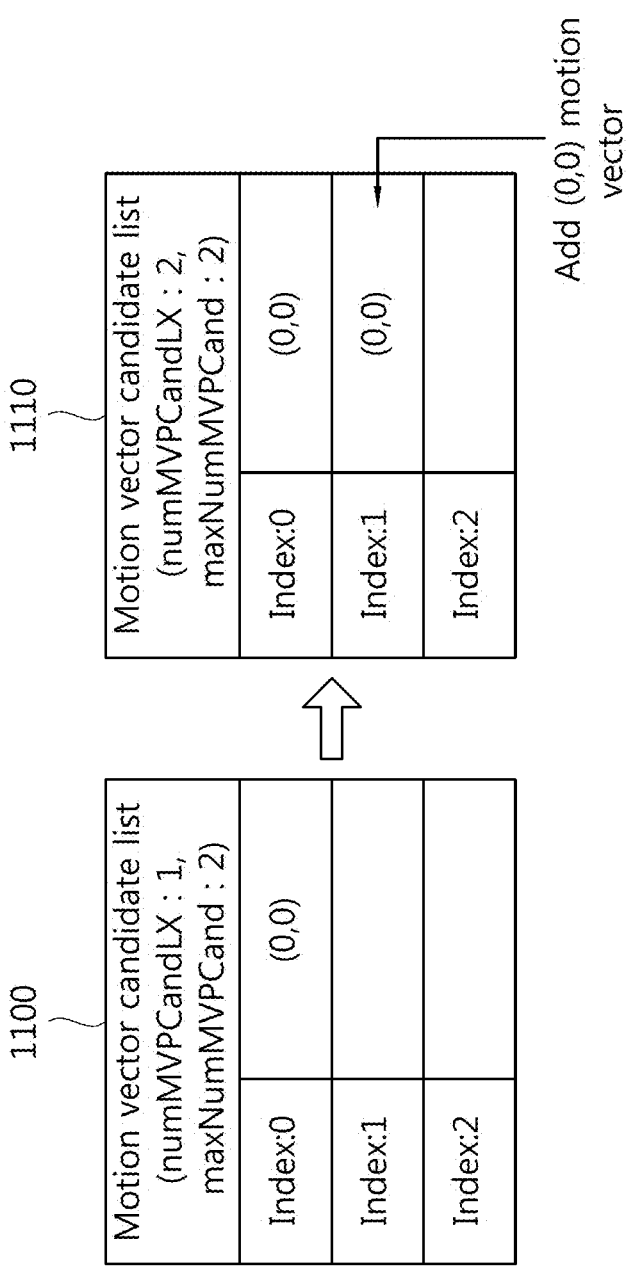
FIG. 11 is a view schematically illustrating an embodiment of adding a (0, 0) motion vector in case one (0, 0) motion vector candidate is present in a motion vector candidate list.

FIG. 11 is a view schematically illustrating an embodiment of adding a (0, 0) motion vector in case one (0, 0) motion vector candidate is present in a motion vector candidate list.

Referring to FIG. 11, in another embodiment of the present invention, the maximum number of motion vector candidates, maxNumMVPCand, may be 2, the number of motion vector candidates included in the motion vector candidate list 1100, numMVPCandLX, may be smaller than the maximum number of motion vector candidates, maxNumMVPCand, and one specific motion vector ((0, 0) motion vector) may be present in the motion vector candidate list 1100. In such case, the encoder and decoder may add a specific motion vector without respect to whether the specific motion vector ((0, 0) motion vector) is present in the motion vector candidate list 1100. Accordingly, one more specific motion vector may be added so that a size-adjusted motion vector candidate list 1110 may be generated. At this time, the added specific motion vector may be a vector having a predetermined fixed integer or may be a (0, 0) motion vector. While adding the specific motion vector, the number of motion vector candidates included in the motion vector candidate list, numMVPCandLX, may be increased. Accordingly, as many (0, 0) motion vectors as the maximum number of motion vector candidates, maxNumMVPCand, may be included in the motion vector candidate list 1110. The encoder and decoder adds a specific motion vector by conducting only the comparison between the number of motion vector candidates included in the motion vector candidate list, numMVPCandLX and the maximum number of motion vector candidates, maxNumMVPCand, and thus, does not determine whether the specific motion vector is present in the list, thus leading to a reduction in computation complexity.

Figure 12:
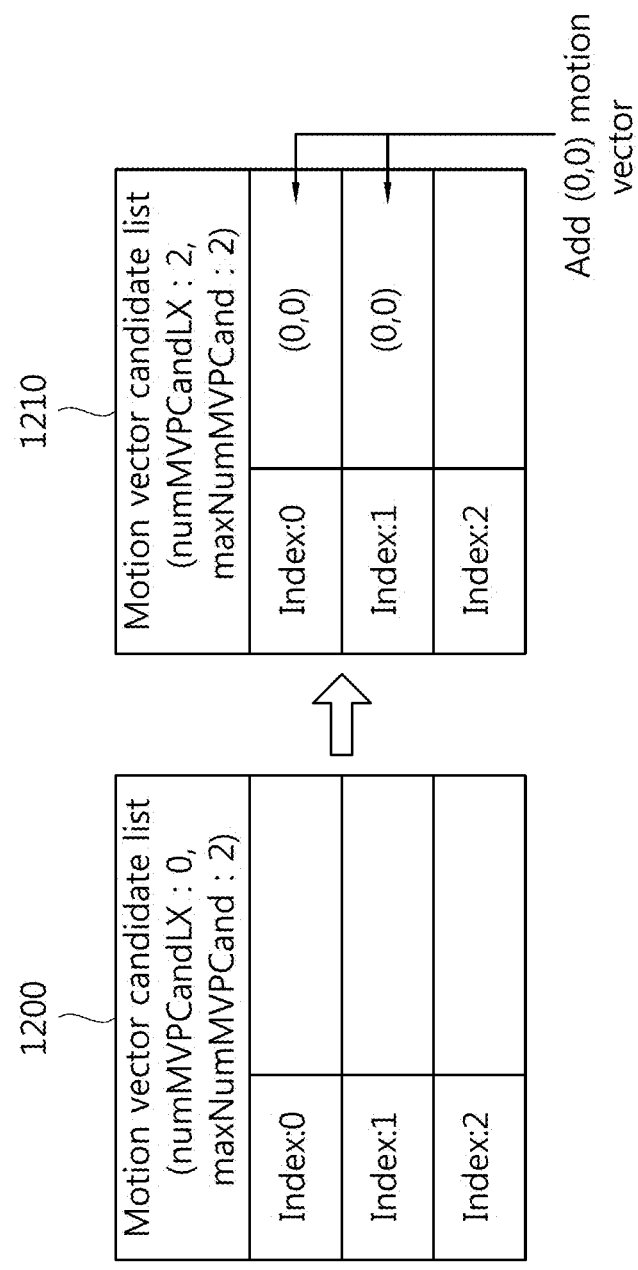
FIG. 12 is a view schematically illustrating an embodiment of adding (0, 0) motion vectors in case no motion vector is present in a motion vector candidate list.

FIG. 12 is a view schematically illustrating an embodiment of adding (0, 0) motion vectors in case no motion vector is present in a motion vector candidate list.

Referring to FIG. 12, in still another embodiment of the present invention, the maximum number of motion vector candidates, maxNumMVPCand, may be 2, the number of motion vector candidates included in the motion vector candidate list 1200, numMVPCandLX may be smaller than the maximum number of motion vector candidates, maxNumMVPCand, and no motion vector may be present in the motion vector candidate list 1200. In such scenario, the encoder and decoder may repeatedly add a specific motion vector irrespective of whether a motion vector candidate is present in the motion vector candidate list 1200. While adding the specific motion vector, the number of motion vector candidates included in the motion vector candidate list, numMVPCandLX, may be increased.

In other words, the encoder and decoder may add specific motion vectors until the number of motion vector candidates included in the motion vector candidate list, numMVPCandLX, reaches the maximum number of motion vector candidates, maxNumMVPCand. As in the above embodiment, in case the maximum number of motion vector candidates, maxNumMVPCand, is 2, two specific motion vectors may be added. At this time, the added specific motion vectors may be vectors having a predetermined fixed integer or may be (0, 0) motion vectors. Accordingly, as many (0, 0) motion vectors as the maximum number of motion vector candidates, maxNumMVPCand, may be included in the motion vector candidate list 1210. The encoder and decoder add specific motion vectors by performing only the comparison between the number of motion vector candidates included in the motion vector candidate list, numMVPCandLX, and the maximum number of motion vector candidates, maxNumMVPCand, and thus, no determination is made on whether a motion vector candidate is present in the list, thus resulting in a reduction in computation complexity.

Although not illustrated in the drawings, according to yet still another embodiment of the present invention, in case the maximum number of motion vector candidates, maxNumMVPCand, is 2, and the number of motion vector candidates included in the motion vector candidate list, numMVPCandLX, is smaller than the maximum number of motion vector candidates, maxNumMVPCand, one specific motion vector may be added. While the specific motion vector is added, the number of motion vector candidates included in the motion vector candidate list, numMVPCandLX, may be increased. In other words, without repeatedly adding a specific motion vector to be added, only one specific motion vector may be added. For example, in case no motion vector is present in the motion vector candidate list, the encoder and decoder may add one specific motion vector irrespective of whether a motion vector candidate is present in the motion vector candidate list. While the specific motion vector is added, the number of motion vector candidates included in the motion vector candidate list, numMVPCandLX, may be increased. At this time, the added specific motion vector may be a vector having a predetermined fixed integer, or may be a (0, 0) motion vector. Even in such case, the encoder and decoder add a specific motion vector by making only comparison between the number of motion vector candidates included in the motion vector candidate list, numMVPCandLX, and the maximum number of motion vector candidates, maxNumMVPCand, and thus, no determination is made on whether a motion vector candidate is present in the motion vector candidate list, thus decreasing computation complexity.

Figure 13:
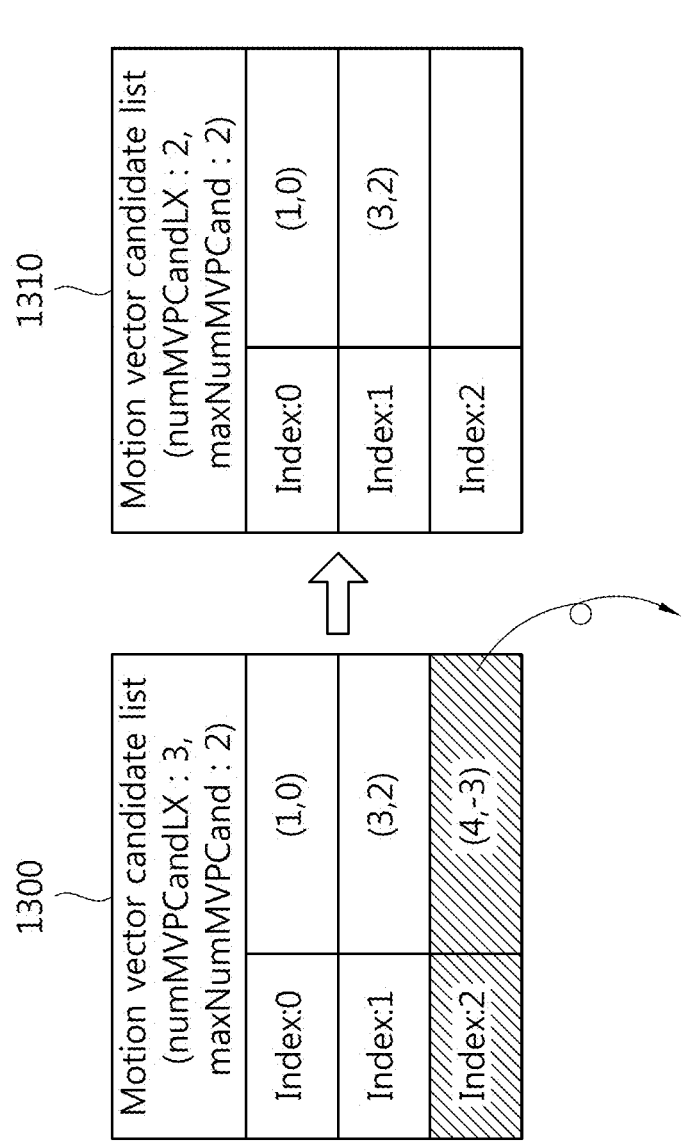
FIG. 13 is a view schematically illustrating an embodiment of removing some motion vectors from a motion vector candidate list.

FIG. 13 is a view schematically illustrating an embodiment of removing some motion vectors from a motion vector candidate list.

Referring to FIG. 13, in an embodiment of the present invention, in case the number of motion vector candidates included in the motion vector candidate list 1300, numMVPCandLX, is larger than the maximum number of motion vector candidates, maxNumMVPCand, the encoder and decoder may remove a motion vector candidate having an index of the maximum number of motion vector candidates minus 1 (maxNumMVPCand−1) from the motion vector candidate list 1300. For example, in case the maximum number of motion vector candidates, maxNumMVPCand, is 2, and the number of motion vector candidates included in the motion vector candidate list 1300, numMVPCandLX, is 3, a motion vector candidate (4, −3) having an index of 2, which is larger than 1 that is the maximum number of motion vector candidates, maxNumMVPCand, minus 1 (maxNumMPVCand−1), from the motion vector candidate list 1300, thus generating a size-adjusted motion vector candidate list 1310.

According to another embodiment of the present invention, in case the number of motion vector candidates included in the motion vector candidate list, numMVPCandLX, is larger than or equal to the maximum number of motion vector candidates, maxNumMVPCand, the encoder and decoder may remove a motion vector candidate having an index that is larger than the maximum number of motion vector candidates, maxNumMVPCand, minus 1 (maxNumMVPCand−1), from the motion vector candidate list.

Figure 14:
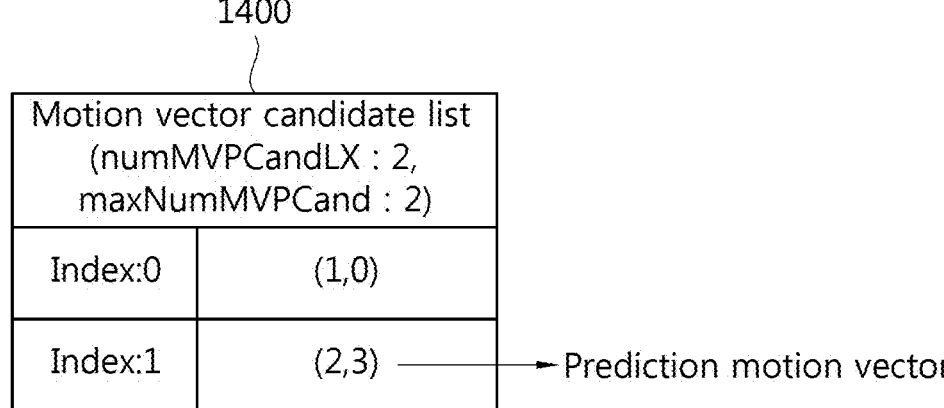
FIG. 14 is a view schematically illustrating a process of determining a prediction motion vector among motion vector candidates in a motion vector candidate list.

FIG. 14 is a view schematically illustrating a process of determining a prediction motion vector among motion vector candidates in a motion vector candidate list.

Referring to FIG. 14, the encoder and decoder may determine a prediction motion vector from motion vector candidates included in a motion vector candidate list 1400 that has been adjusted by the above process.

According to an embodiment, the encoder and decoder may determine, as a prediction motion vector, a motion vector candidate in the motion vector candidate list 1400 corresponding to a specific motion vector candidate index. For example, in case the maximum number of motion vector candidates, maxNumMVPCand, is 2, and the motion vector candidate index is 1, a motion vector candidate (2, 3) may be determined as the prediction motion vector.

The encoder and decoder may generate a prediction block by performing inter prediction or motion compensation based on the determined prediction motion vector value.

Although in the embodiments the methods are described based on flowcharts with a series of steps or blocks, the present invention is not limited to the order, and some steps may be performed simultaneously with or in a different sequence from other steps. Further, it may be understood by those skilled in the art that other steps may be non-exclusively included in the steps of the flowcharts or one or more steps may be removed from the flowcharts without affecting the scope of the present invention.

The above-described embodiments include various aspects of examples. Although all possible combinations of the various aspects of examples may be not described herein, it will be understood by those skilled in the art that such combinations are possible. Accordingly, the present invention includes all other modifications, variations, or changes that may be made to the appending claims.

What is claimed is:

1. An image decoding method comprising:

configuring a motion vector candidate list;

modifying the motion vector candidate list based on a number of motion vector candidates in the motion vector candidate list; and determining a prediction motion vector based on the modified motion vector candidate list, wherein the motion vector candidate list includes at least one of a spatial motion vector candidate, a temporal motion vector candidate and a specific motion vector candidate, wherein the temporal motion vector candidate is generated by performing scaling when a distance between a current picture and a reference picture of the current block is different from a distance between a collocated picture and a reference picture of a collocated block, wherein the configuring the motion vector candidate list comprises;

deriving the spatial motion vector candidate, deriving the temporal motion vector candidate, and adding at least one of the derived spatial motion vector candidate and the derived temporal motion vector candidate to the motion vector candidate list, wherein an operation of removing the same motion vector candidate is carried out only on spatial motion vector candidates and the temporal motion vector candidate is derived except when two derived spatial motion vector candidates are present and different from each other, wherein when the number of motion vector candidates in the motion vector candidate list is smaller than a maximum number of motion vector candidates, the modifying the motion vector candidate list includes repeatedly adding the specific motion vector candidate until the number of motion vector candidates in the motion vector candidate list reaches the maximum number of motion vector candidates, and wherein the maximum number of motion vector candidates is 2 and when no motion vector candidate is present in the motion vector candidate list, two specific motion vector candidates are added to the motion vector candidate list.

2. The image decoding apparatus of claim 1, wherein the specific motion vector candidate is a (0,0) motion vector.

3. An image encoding method comprising:

generating a prediction block by performing an inter prediction; and performing an entropy encoding of a residual block corresponding to a difference between a current block and the prediction block predicted by the inter prediction, wherein a prediction motion vector corresponding to the prediction block is included in a motion vector candidate list, wherein the motion vector candidate list includes at least one of a spatial motion vector candidate, a temporal motion vector candidate and a specific motion vector candidate, wherein the temporal motion vector candidate is generated by performing scaling when a distance between a current picture and a reference picture of the current block is different from a distance between a collocated picture and a reference picture of a collocated block, wherein the motion vector candidate list is configured by:

deriving the spatial motion vector candidate, deriving the temporal motion vector candidate, and adding at least one of the derived spatial motion vector candidate and the derived temporal motion vector candidate to the motion vector candidate list, wherein an operation of removing the same motion vector candidate is carried out only on spatial motion vector candidates and the temporal motion vector candidate is derived except when two derived spatial motion vector candidates are present and different from each other, wherein when the number of motion vector candidates in the motion vector candidate list is smaller than a maximum number of motion vector candidates, the modifying the motion vector candidate list includes repeatedly adding the specific motion vector candidate until the number of motion vector candidates in the motion vector candidate list reaches the maximum number of motion vector candidates, and wherein the maximum number of motion vector candidates is 2 and when no motion vector candidate is present in the motion vector candidate list, two specific motion vector candidates are added to the motion vector candidate list.

4. The image encoding method of claim 3, wherein the specific motion vector candidate is a (0,0) motion vector.

* * * * *